US011101465B2

(12) United States Patent
Park et al.

(10) Patent No.: US 11,101,465 B2
(45) Date of Patent: *Aug. 24, 2021

(54) REACTION BARRIER BETWEEN ELECTRODE ACTIVE MATERIAL AND CURRENT COLLECTOR

(71) Applicant: Enevate Corporation, Irvine, CA (US)

(72) Inventors: Benjamin Yong Park, Mission Viejo, CA (US); Rahul R. Kamath, Mission Viejo, CA (US); Fred Bonhomme, Lake Forest, CA (US)

(73) Assignee: Enevate Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,693

(22) Filed: Apr. 28, 2020

(65) Prior Publication Data

US 2020/0259184 A1    Aug. 13, 2020

Related U.S. Application Data

(63) Continuation-in-part of application No. 16/678,061, filed on Nov. 8, 2019, and a continuation-in-part of application No. 15/471,860, filed on Mar. 28, 2017.

(51) Int. Cl.

| | |
|---|---|
| *H01M 4/62* | (2006.01) |
| *H01M 4/04* | (2006.01) |
| *H01M 4/1395* | (2010.01) |
| *H01M 4/38* | (2006.01) |
| *H01M 4/134* | (2010.01) |
| *H01M 10/0525* | (2010.01) |
| *H01M 4/02* | (2006.01) |

(52) U.S. Cl.
CPC ......... *H01M 4/628* (2013.01); *H01M 4/0404* (2013.01); *H01M 4/0471* (2013.01); *H01M 4/134* (2013.01); *H01M 4/1395* (2013.01); *H01M 4/386* (2013.01); *H01M 10/0525* (2013.01); *H01M 2004/027* (2013.01)

(58) Field of Classification Search
None
See application file for complete search history.

(56) References Cited

U.S. PATENT DOCUMENTS

| | | | | |
|---|---|---|---|---|
| 6,413,672 B1 * | 7/2002 | Suzuki | ............ | H01M 4/04 429/231.95 |
| 2002/0028389 A1 * | 3/2002 | Sonoda | ............ | H01G 9/022 429/324 |
| 2012/0088150 A1 * | 4/2012 | Hwang | ............ | C08G 73/14 429/211 |
| 2014/0170475 A1 * | 6/2014 | Park | ............ | H01M 4/0435 429/188 |

(Continued)

FOREIGN PATENT DOCUMENTS

CN            108539280 A  *  9/2018

*Primary Examiner* — Kenneth J Douyette
*Assistant Examiner* — Heng M. Chan
(74) *Attorney, Agent, or Firm* — McAndrews, Held & Malloy, Ltd.

(57) ABSTRACT

Systems and methods are provided for a reaction barrier between an electrode active material and a current collector. An electrode may comprise an active material, a metal foil, and a polymer. The polymer (such as polyamide-imide (PAI)) may be configured to provide a carbonized barrier between the active material and the metal foil after pyrolysis.

13 Claims, 7 Drawing Sheets

(56) References Cited

U.S. PATENT DOCUMENTS

2014/0295290 A1\* 10/2014 Park .................... H01M 4/1395
                                                          429/342
2017/0271678 A1\* 9/2017 Yang .................... H01M 4/134
2018/0287129 A1\* 10/2018 Park ..................... H01M 4/667

\* cited by examiner

PAA Coated Copper

Carbonized PAA layers

Carbon layer interrupted

REACTION BARRIER BETWEEN ELECTRODE ACTIVE MATERIAL AND CURRENT COLLECTOR

The present application is a continuation-in-part of U.S. application Ser. No. 16/678,061 filed Nov. 8, 2019. The present application is also a continuation-in-part of U.S. application Ser. No. 15/471,860, field Mar. 28, 2017. Each of the aforementioned applications is incorporated by reference herein in its entirety.

FIELD

Aspects of the present disclosure relate to energy generation and storage. More specifically, certain embodiments of the disclosure relate to a method and system for providing a reaction barrier between an electrode active material and a current collector.

BACKGROUND

Conventional approaches for battery anodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method are provided for a reaction barrier between an electrode active material and a current collector, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
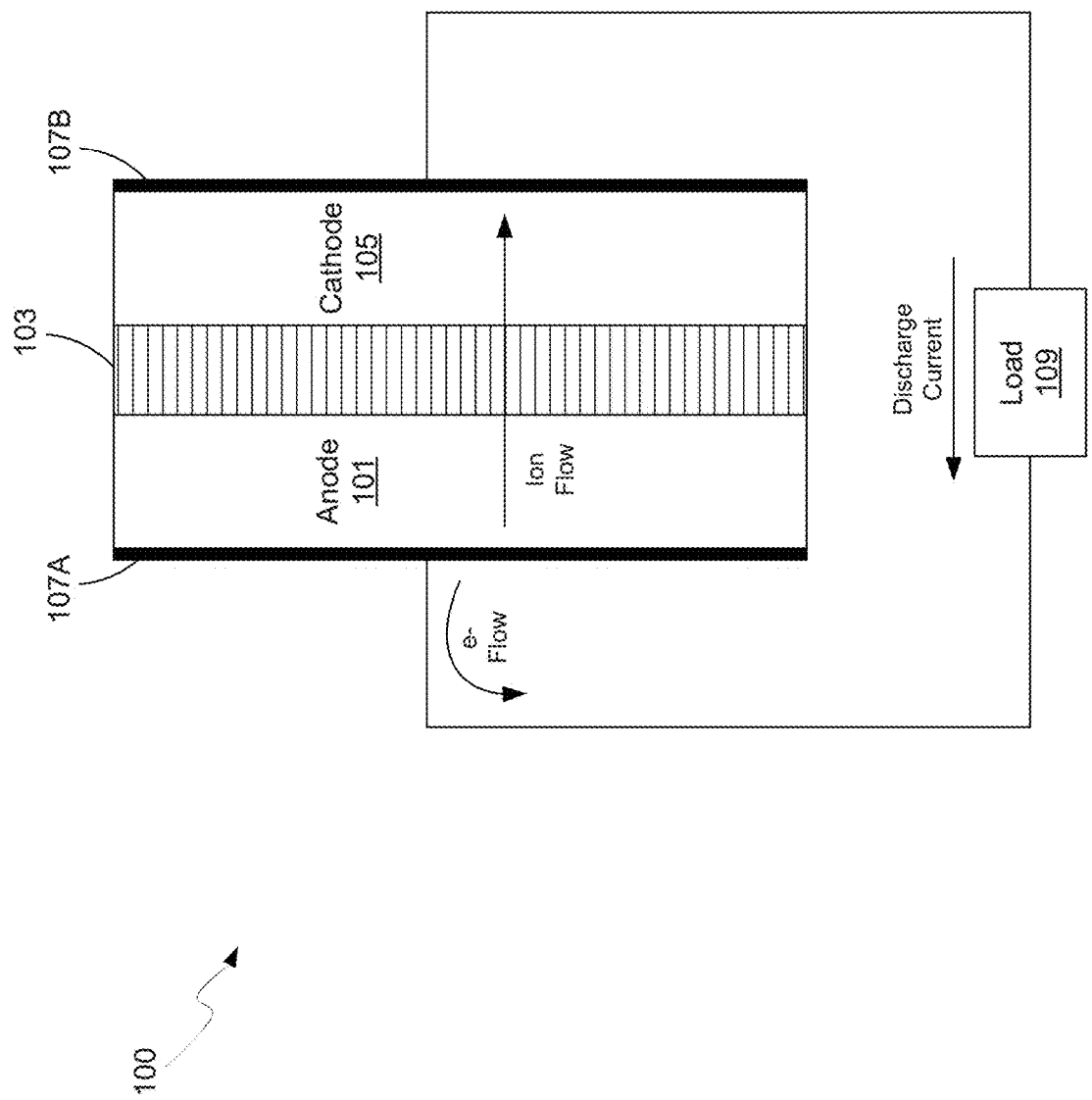
FIG. 1 is a diagram of a battery with anode expansion configured via silicon particle size, in accordance with an example embodiment of the disclosure.

FIG. 1 is a diagram of a battery with a silicon-dominant anode that experiences anode expansion, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 107B, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

Figure 2:
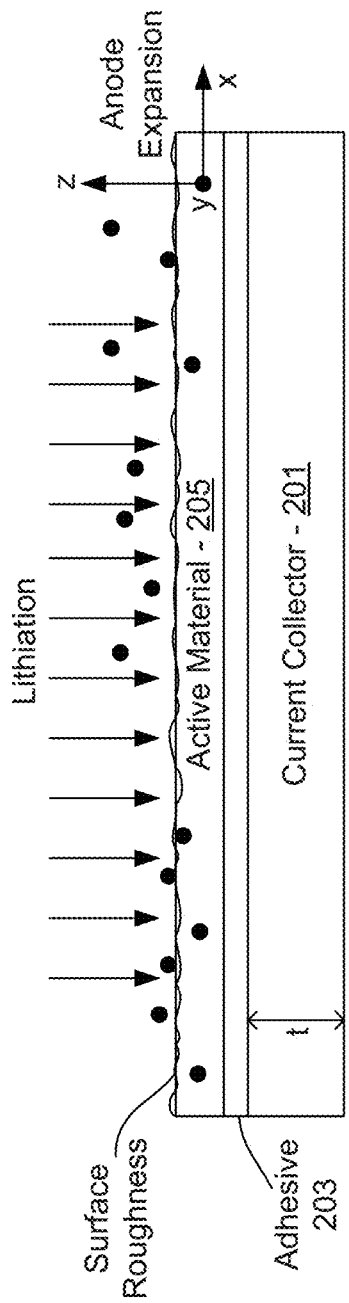
FIG. 2 illustrates anode expansion during lithiation, in accordance with an example embodiment of the disclosure.

FIG. 2 illustrates anode expansion during lithiation, in accordance with an example embodiment of the disclosure. Referring to FIG. 2, there are shown a current collector 201, an optional adhesive 203, and an active material 205. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a binder material and a solvent, the active material 205 being pyrolyzed to turn the binder into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

Figure 3:
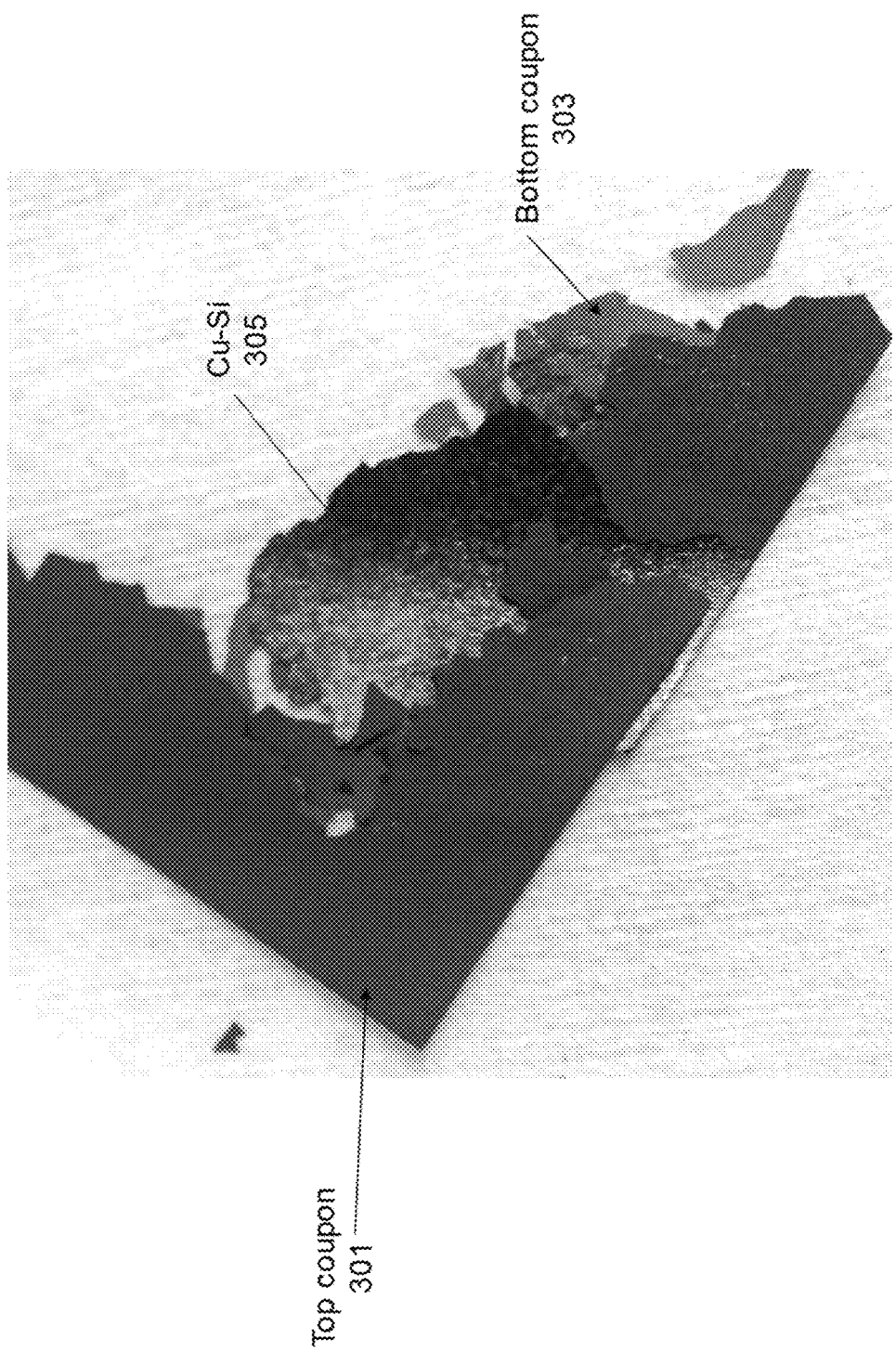
FIG. 3 illustrates the formation of copper silicide, which is a problem that is overcome in accordance with one or more embodiments of the disclosure.

FIG. 3 illustrates the formation of copper silicide, which is a problem that is overcome in accordance with one or more embodiments of the disclosure. When copper is covered by polyacrylic acid (PAA), placed between coupons (i.e., pieces of active material, such as, for example, active material film 205 in FIG. 2) and heated to 850° C., the copper will react with the silicon from the coupons 301 and 303 and form copper silicide ($Cu_xSi$) 305, which makes the combination useless for a battery.

PI (polyimide), for example, may also be used for direct coating onto copper (or nickel). However, the performance of PI (like PAA) suffers during pyrolysis. While an increase of Si can improve PI performance, the use of PAI (Poly-amide-imide) results in a better precursor of pyrolyzed carbon than PI. Since PAI carbonizes faster and at a lower temperature than PI, PAI is better suited for the low temperature process of direct coating. At higher temperatures, there is a risk of $Cu_xSi$ (or NixSi) formation that may destroy the current collector. A PAI layer added during coating may prevent a reaction between the silicon of the active material and the current collector. This coating may also be performed with simultaneous multi-layer coating or multiple coatings done sequentially.

Figure 4:
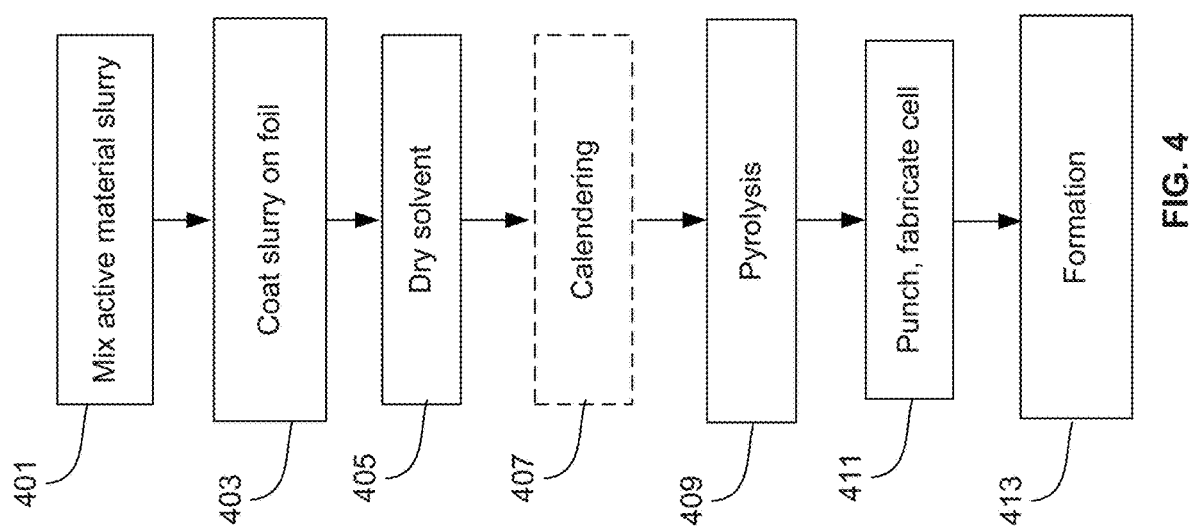
FIG. 4 is a flow diagram of a process for direct coating electrodes, in accordance with an example embodiment of the disclosure.

FIG. 4 is a flow diagram of a process for direct coating electrodes, in accordance with an example embodiment of the disclosure. This process comprises physically mixing the active material, conductive additive, and binder together, and coating it directly on a current collector. This example process comprises a direct coating process in which an anode slurry is directly coated on a copper foil using a binder such as CMC, SBR, Sodium Alginate, PAI, PAA, PI and mixtures and combinations thereof. Another example process comprising forming the active material on a substrate and then transferring to the current collector is described with respect to FIG. 5.

In step 401, the raw electrode active material may be mixed using a binder/resin (such as PI, PAI), solvent, and conductive carbon. For example, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (15% solids in N-Methyl pyrrolidone (NMP)) at, e.g., 1000 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 403, the slurry may be coated on the foil at a loading of, e.g., 3-4 mg/cm$^2$, which may undergo drying in step 405 resulting in less than 12-18% residual solvent content. In step 407, an optional calendering process may be utilized where a series of hard pressure rollers may be used to finish the film/substrate into a smoother and denser sheet of material.

In step 409, the active material may be pyrolyzed by heating to 500-800° C. such that carbon precursors are partially or completely converted into glassy carbon. The pyrolysis step may result in an anode active material having silicon content greater than or equal to 50% by weight, where the anode has been subjected to heating at or above 400 degrees Celsius. Pyrolysis can be done either in roll form or after punching in step 411. If done in roll form, the punching is done after the pyrolysis process. The punched electrode may then be sandwiched with a separator and cathode with electrolyte to form a cell. In step 413, the cell may be subjected to a formation process, comprising initial charge and discharge steps to lithiate the anode, with some residual lithium remaining.

Figure 5:
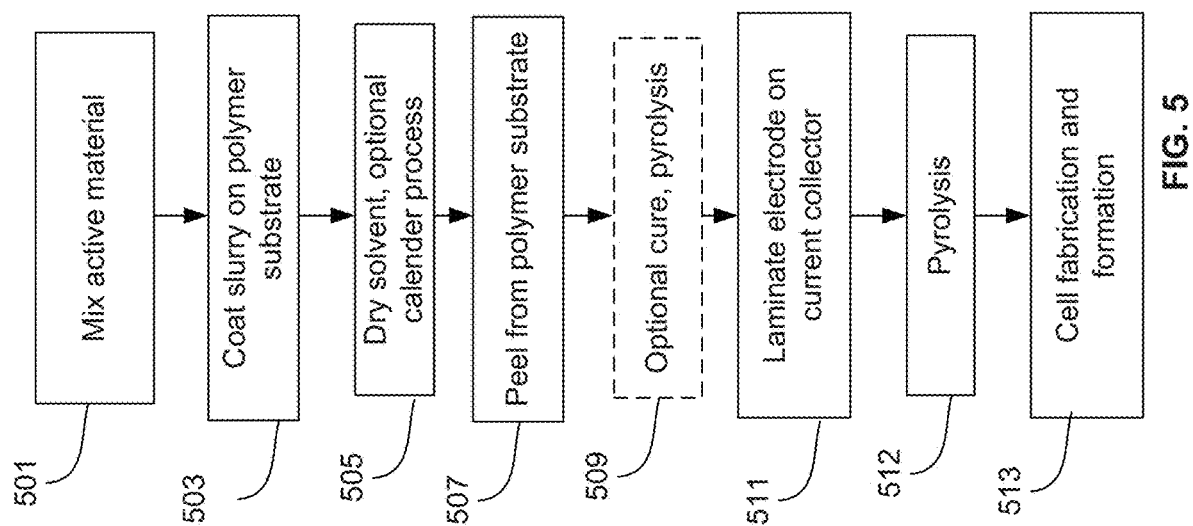
FIG. 5 is a flow diagram of an alternative process for transfer lamination of electrodes, in accordance with an example embodiment of the disclosure.

FIG. 5 is a flow diagram of an alternative process for transfer lamination of electrodes, in accordance with an example embodiment of the disclosure. While the previous process to fabricate composite anodes employs a direct coating process, this process physically mixes the active material, conductive additive, and binder together coupled with peeling and lamination processes.

This process is shown in the flow diagram of FIG. 5, starting with step 501 where the active material may be mixed with a binder/resin such as polyimide (PI) or polyamide-imide (PAI), solvent, the silosilazane additive, and optionally a conductive carbon. As with the process described in FIG. 4, graphene/VGCF (1:1 by weight) may be dispersed in NMP under sonication for, e.g., 45-75 minutes followed by the addition of Super P (1:1:1 with VGCF and graphene) and additional sonication for, e.g., 45-75 minutes. Silicon powder with a desired particle size, may then be dispersed in polyamic acid resin (10-20% solids in N-Methyl pyrrolidone (NMP)) at, e.g., 800-1200 rpm in a ball miller for a designated time, and then the conjugated carbon/NMP slurry may be added and dispersed at, e.g., 1800-2200 rpm for, e.g., another predefined time to achieve a slurry viscosity within 2000-4000 cP and a total solid content of about 30%. The particle size and mixing times may be varied to configure the active material density and/or roughness.

In step 503, the slurry may be coated on a polymer substrate, such as polyethylene terephthalate (PET), polypropylene (PP), or Mylar. The slurry may be coated on the PET/PP/Mylar film at a loading of 3-4 mg/cm$^2$ (with 15% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 15 h, 200-240° C. for 5 h). The dry film may be thermally treated at 1000-1300° C. to convert the polymer matrix into carbon. The pyrolysis step may result in an anode active material having silicon content greater than or equal to 50% by weight, where the anode has been subjected to heating at or above 400 degrees Celsius. Note that curing and pyrolysis at 509 is optional.

In step 511, the material (that may or may not be pyrolyzed) may be flat press or roll press laminated on the current collector, where a copper foil may be coated with polyamide-imide with a nominal loading of 0.35-0.75 mg/cm$^2$ (applied as a 5-7 wt % varnish in NMP, dried 10-20 hour at 100-140° C. under vacuum). In flat press lamination, the silicon-carbon composite film may be laminated to the coated copper using a heated hydraulic press (30-70 seconds, 250-350° C., and 3000-5000 psi), thereby forming the silicon-composite electrode. In another embodiment, the material may be roll-press laminated to the current collector.

The lamination may be followed by pyrolysis 512, and may be vacuum dried using a two-stage process (100-140° C. for 15 h, 200-240° C. for 5 h). The laminated foil may be thermally treated at 1000-1300° C. to convert the polymer matrix into carbon. The pyrolysis step may result in an electrode active material having silicon content greater than or equal to 50% by weight, where the electrode has been subjected to heating at or above 400° C. and up to 800° C. In step 513, the electrode may then be sandwiched with a separator and cathode with electrolyte to form a cell. The cell may be subjected to a formation process, comprising initial charge and discharge steps to lithiate the anode, with some residual lithium remaining. The performance of the cell may then be assessed.

Figure 6A:
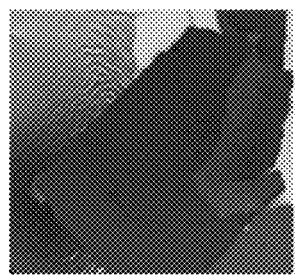
FIG. 6A illustrates the formation of carbon on PAA-coated copper that has been pyrolyzed at 780° C.

FIG. 6A illustrates the formation of carbon on PAA-coated copper that has been pyrolyzed at 780° C. This carbon, however, is powdery and not uniformly spread across the copper.

Figure 6B:
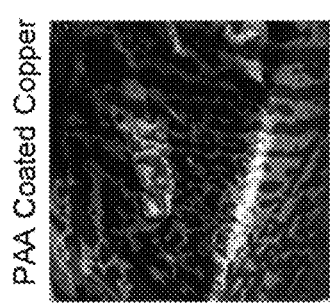
FIG. 6B illustrates the formation of Si—Cu on PAA-coated copper that has been covered by an active material and pyrolyzed at 780° C.

FIG. 6B illustrates the formation of Si—Cu on PAA-coated copper that has been covered by an active material and pyrolyzed at 780° C. Because the carbonization of PAA does not provide a sufficient barrier between the silicon in the active material and the copper, copper silicide is formed, thus destroying the electrode mechanical integrity.

Figure 6D:
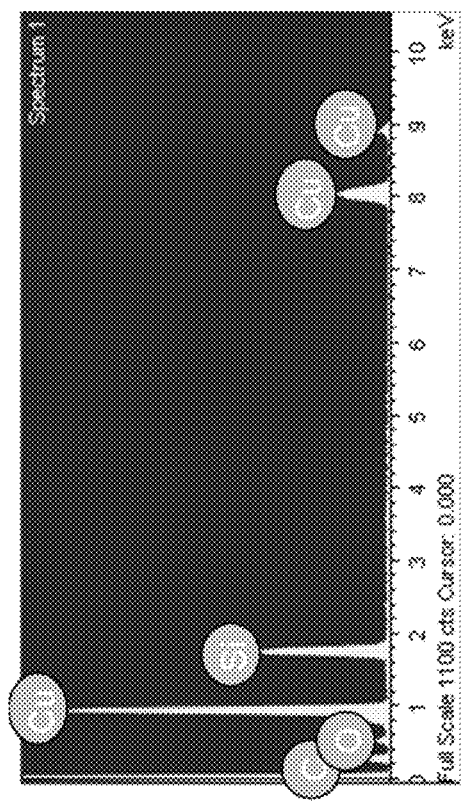
FIG. 6D illustrates the spectrum of active-material-covered, PAA-coated copper that has been pyrolyzed at 780° C.
Figure 6C:
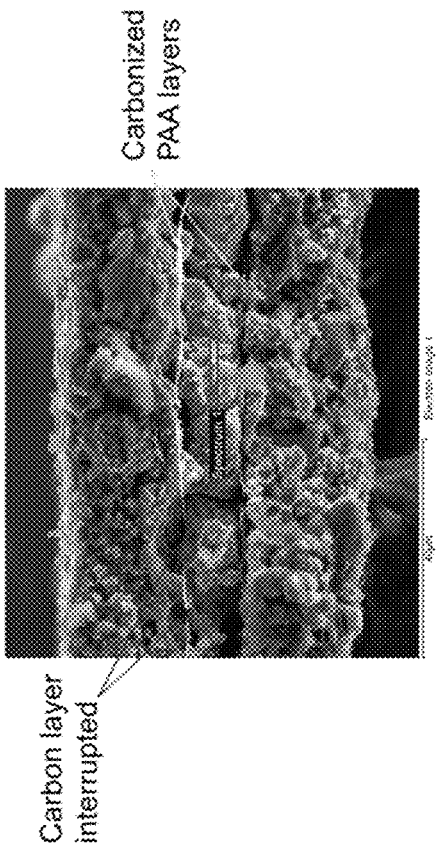
FIG. 6C illustrates a microscopic view of active-material-covered, PAA-coated copper that has been pyrolyzed at 780° C.

FIG. 6C illustrates a microscopic view of active-material-covered, PAA-coated copper that has been pyrolyzed at 780° C. As shown, the carbonized PAA layers between the copper substrate and the silicon based active material layer are non-continuous leaving copper and silicon free to react and to form Cu—Si starting from those areas where the carbonized PAA layer is interrupted.

FIG. 6D illustrates the spectrum of active-material-covered, PAA-coated copper that has been pyrolyzed at 780° C. The spectrum includes the signature of silicon as further proof that silicon has reacted with the copper substrate.

Figure 7B:
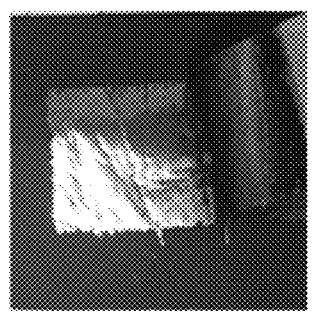
FIG. 7B illustrates that Si—Cu is not formed on PAI-coated copper that has been covered by an active material and pyrolyzed at 780° C.
Figure 7D:
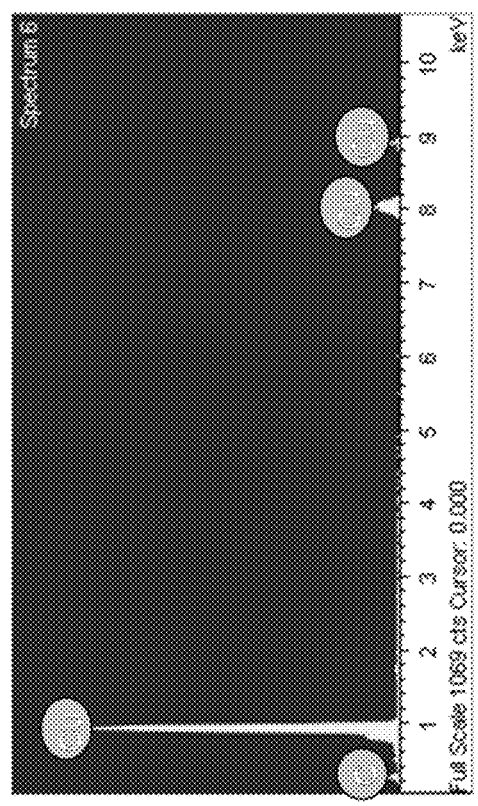
FIG. 7D illustrates the spectrum of active-material-covered, PAI-coated copper that has been pyrolyzed at 780° C.
Figure 7A:
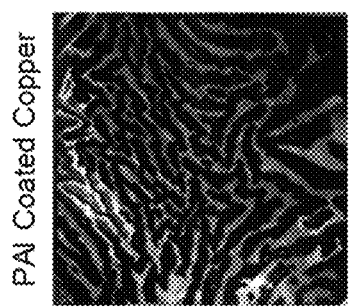
FIG. 7A illustrates the formation of carbon on PAI-coated copper that has been pyrolyzed at 780° C.

FIG. 7A illustrates the formation of carbon on PAI-coated copper that has been pyrolyzed at 780° C. While this carbon appears striated, it is strongly affixed to the copper.

FIG. 7B illustrates that Si—Cu is not formed on active-material-covered, PAI-coated copper that has been pyrolyzed at 780° C. The carbonization of PAI does provide a sufficient barrier between the silicon in the slurry and the copper, and copper silicide is not formed.

Figure 7C:
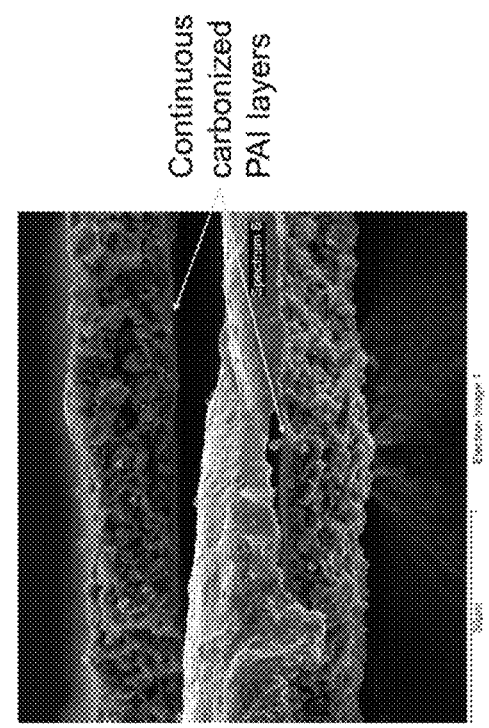
FIG. 7C illustrates a microscopic view of active-material-covered, PAI-coated copper that has been pyrolyzed at 780° C.

FIG. 7C illustrates a microscopic view of active-material-covered, PAI-coated copper that has been pyrolyzed at 780° C. As shown, the PAI has formed a continuous carbon layer between the copper and the silicon based anode active material.

FIG. 7D illustrates the spectrum of active-material-covered, PAI-coated copper that has been pyrolyzed at 780° C. The spectrum lacks the silicon signature, because silicon is not mixed with the copper substrate.

Accordingly, this disclosure provides systems and methods for creating a reaction barrier, in an electrode, between an active material and a current collector such as a metal foil. An electrode may comprise a carbonized film, as reaction barrier, sandwiched between an active material and a metal foil. The carbonized film may be produced from a polymer during pyrolysis.

A method of producing an electrode comprises covering (e.g., coating) a metal foil (or other current collector) with a polymer and an active material, and pyrolyzing the covered metal foil. The polymer may be applied to the active material prior to a lamination of the metal foil. Alternatively, the polymer may be applied to the metal foil prior to a covering (e.g., coating) by the active material, to produce a polymer-coated metal foil. The active-material-coated, polymer-coated metal foil is subsequently pyrolyzed to produce a carbonized barrier from the polymer.

The active material may also be produced by tape casting a slurry. For electrode production using tape casting, the slurry can be applied to a surface such as a stainless steel drum or a Mylar belt. The slurry is then dried, peeled from the surface and laminated to the metal foil. The polymer can be used for adhesion between the dried slurry and the metal foil. Following lamination, the assembly may be pyrolyzed to produce a carbonized barrier from the polymer.

When used as an anode, the active material may be configured to yield silicon constituting over 50% of weight of the electrode after pyrolysis. When used as a cathode, the active material may comprise, for example, NCA, NCM, LCO or LMO. The polymer (such as polyamide-imide (PAI)) may be configured to provide a continuous carbonized layer between the active material and the metal foil after pyrolysis. When used as an anode in a lithium-ion battery, the electrode may comprise a copper or nickel foil. When used as a cathode in a lithium-ion battery, the electrode may comprise an aluminum foil. Pyrolysis is configured at 800° C. or less.

The carbonized film formed between the silicon layer and the metal layer prevents the formation of a metal-silicon compound after pyrolysis. When an anode of a lithium-ion battery is produced, the carbonized film is configured to prevent the formation of copper or nickel silicide after pyrolysis. When a cathode of a lithium-ion battery is produced, the carbonized film is configured to prevent the formation of undesirable side reactions between the active material and the current collector after pyrolysis.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of producing an electrode, the method comprising:
    covering a metal foil with a polymer and an active material; and
    pyrolyzing the covered metal foil, wherein the polymer is configured to produce a carbonized film between the active material and the metal foil.

2. The method according to claim 1, wherein the method comprises using the electrode as an anode in a lithium-ion battery.

3. The method according to claim 1, wherein the method comprises using the electrode as a cathode in a lithium-ion battery.

4. The method according to claim 1, wherein the polymer comprises polyamide-imide (PAI).

5. The method according to claim 1, wherein the pyrolysis is configured at 800° C. or less.

6. The method according to claim 1, wherein the carbonized film is configured to prevent the formation of a metal-silicon compound.

7. The method according to claim 1, wherein the carbonized film is configured to prevent the formation of copper silicide.

8. The method according to claim 1, wherein the carbonized film is configured to prevent the formation of nickel silicide.

9. The method according to claim 1, wherein the method comprises:
    applying a slurry to a surface;
    drying the slurry; and
    peeling the dry slurry from the surface to produce the active material.

10. The method according to claim 1, wherein the method comprises:
    coating the metal foil with the polymer; and
    laminating the active material to the polymer-coated metal foil.

11. The method according to claim 1, wherein the method comprises:
    coating the active material with the polymer; and
    laminating the polymer-coated active material to the metal foil.

12. The method according to claim 1, wherein the active material is configured to yield silicon constituting over 50% of weight after pyrolysis.

13. The method according to claim 1, wherein the method comprises:
    coating the metal foil with the polymer;
    coating the polymer-coated metal foil with the active material; and
    pyrolyzing the active-material-coated, polymer-coated metal foil.

* * * * *